(12) United States Patent
Nordström

(10) Patent No.: US 7,735,697 B2
(45) Date of Patent: Jun. 15, 2010

(54) OUTPUT DEVICE FOR CONTAINER

(75) Inventor: Gunnar Nordström, Nynäshamn (SE)

(73) Assignee: Saxlund International AB, Vasterhaninge (SE)

( * ) Notice: Subject to any disclaimer, the term of this patent is extended or adjusted under 35 U.S.C. 154(b) by 218 days.

(21) Appl. No.: 10/538,808

(22) PCT Filed: Dec. 15, 2003

(86) PCT No.: PCT/SE03/01946

§ 371 (c)(1),
(2), (4) Date: Feb. 21, 2006

(87) PCT Pub. No.: WO2004/054908

PCT Pub. Date: Jul. 1, 2004

(65) Prior Publication Data

US 2006/0165512 A1  Jul. 27, 2006

(30) Foreign Application Priority Data

Dec. 13, 2002 (SE) .................................. 0203696

(51) Int. Cl.
*G01F 11/00* (2006.01)
(52) U.S. Cl. ............ 222/410; 222/404; 414/302; 414/303; 414/304; 414/324
(58) Field of Classification Search .............. 414/302, 414/303, 304, 324; 222/404, 410; 209/718
See application file for complete search history.

(56) References Cited

U.S. PATENT DOCUMENTS 2,433,738 A * 12/1947 Christensen ................ 209/138
3,011,658 A * 12/1961 Peterson ...................... 198/518
3,733,714 A *  5/1973 Connor ......................... 34/173
4,099,633 A *  7/1978 Cantenot .................... 414/309
4,130,225 A * 12/1978 Illes, Jr. ...................... 222/411
4,150,701 A *  4/1979 Rebucci ..................... 414/304
4,635,408 A *  1/1987 Burke et al. .................. 451/60
4,979,861 A   12/1990 Kilpelainen et al.

FOREIGN PATENT DOCUMENTS

| CH | 659 052 | 12/1986 |
|----|---------|---------|
| DE | 3607786 A1 | 9/1987 |
| FR | 2 309 442 | 11/1976 |
| JP | 6-171765 | 6/1994 |

OTHER PUBLICATIONS

English translation of Japanese Patent Office Notice of Grounds of Rejection, dated Apr. 7, 2009 and issued in corresponding Japanese Patent Application No. 560220/2004.

* cited by examiner

*Primary Examiner*—Michael S Lowe
(74) *Attorney, Agent, or Firm*—Young & Thompson

(57) ABSTRACT

Output device for a container (6) which includes a bottom and a surrounding wall, having a hub (1) and at least two arms (3) fixed to the hub (1). The invention is characterized in that each arm (3) is designed with at least one outer section designed and arranged to at use being capable of essentially preventing material from being brought towards the wall of the container, and at least one inner section connected to the outer section, designed and arranged to at use being capable of bringing the material essentially in the direction of feed for the device, at which the at least two arms (3) present essentially concave surfaces facing the direction of feed.

6 Claims, 5 Drawing Sheets

OUTPUT DEVICE FOR CONTAINER

FIELD OF USE

The present invention concerns an output device for a container, such as for instance a silo and the like. More specifically, the invention concerns a device for discharging of bulk materials such as bark, sludge, vegetables, powder and the like. Such materials have a tendency to pack and cause bridge forming, especially when the moisture content is high, at which problems during discharge from the container can arise.

BACKGROUND

There are different types of output devices for material which is stored in large containers, which devices can be rotors, sliding frames, push floors etc. One kind of containers is silos, where the discharge is made by way of some kind of arrangement in the bottom of the silo for further working or transport of the material. The idea is that the material shall fall down by itself as the material is discharged from beneath, but this is sometimes not the case. Different materials have a tendency to stagnate, form bridges above the output device and along the walls of the silo, whereas less and less material is discharged.

DE 36 07 786 discloses an output device for a silo or a similar container with a circular cross section. The device comprises an arm fixed to a hub, to which a driving device is connected for rotation of the hub and the arm. In the bottom of the silo a circular discharge opening is arranged in the centre thereof. The arm is formed with a bending to force or press the material in the silo towards the centre and out through the discharge opening.

Figure 1A:
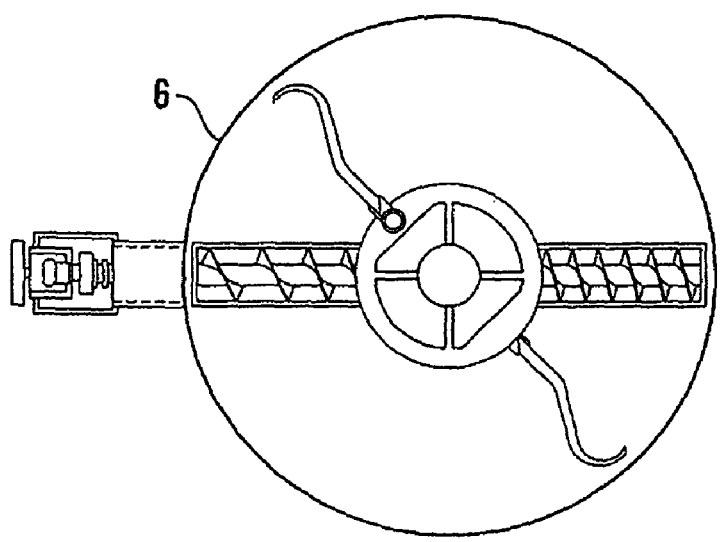
Figure 1B:
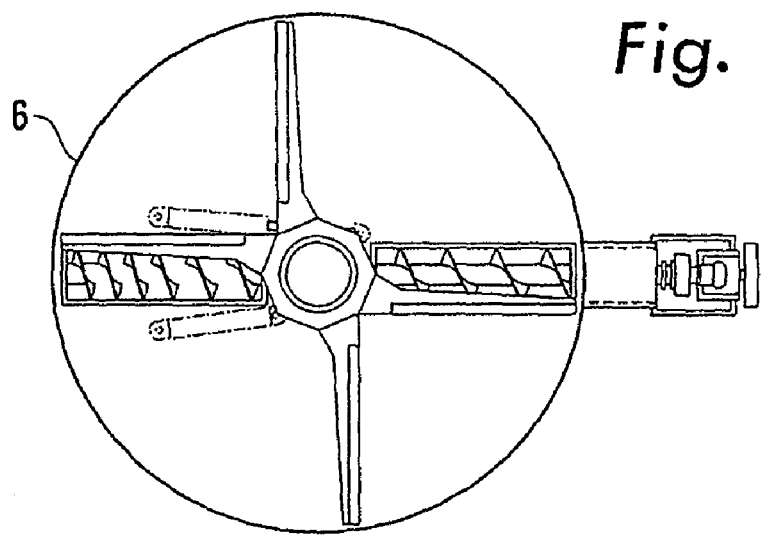
Figure 1C:
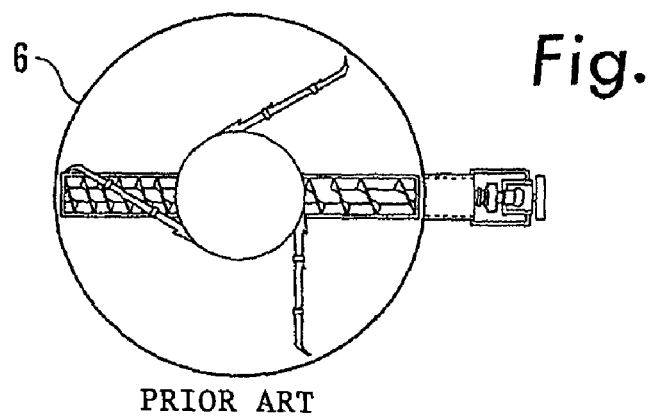

FIGS. 1A, 1B, and 1C show examples of some known output devices for containers with radial discharge opening. These are rotatably arranged on a centre axis and with a number of arms to shove the material so that it falls into a radial opening with conveying screws to carry the material out of the space. These known devices are either arranged with resilient arms, type 1 (hydraulic rotor) and 3 (hydraulic rotor), hydraulically and elastically respectively, or with fixed straight arms, type 2 (sliding star).

A great problem with these types of known output devices is that the direction of feed from the arms is directed towards the wall of the container and forwards. This concerns both the output devices with straight arms as well as resilient or pivotable arms, which at heavy resistance from the material are bent backwards in the direction of rotation. The design of the arms causes the material to be packed towards the walls of the container, and that a certain amount of material in the periphery of the container remains unmoved and that the material that is yet moved is pushed out to the unmoved material and a further compaction (collaring) of the material occurs. Thus, the amount of material being discharged from the discharge opening is not as large as desired, and the efficiency of the device decreases or even that the discharge is stopped.

Concerning straight arms, their design brings that packing towards the periphery can neither be prevented, nor that the compacted material can be disengaged/loosened because of the direction of movement/force directed outwards of these arms.

One drawback with the solution with fixed straight arms, except for the direction of feed, is that the arms in certain positions cover large parts of the discharge opening, which is to disadvantage of the continuity of the material supply into the opening. Thus, this also affects the efficiency of the device in a negative way.

Figure 2:
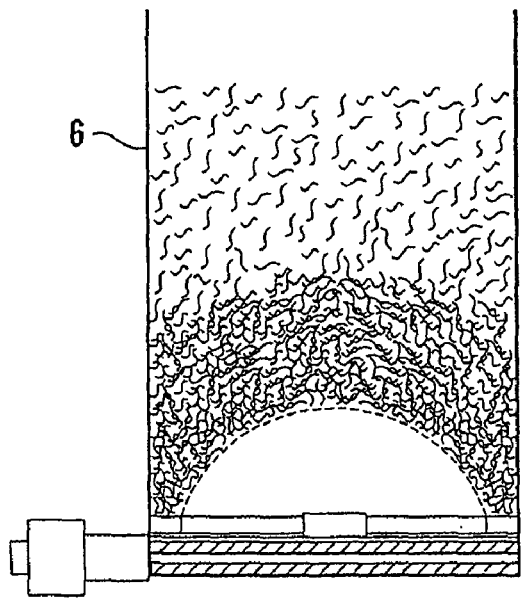

Even a successive packing vertically can occur above the output device, at which an arch of packed material gradually is formed and the output device idles and the discharging stops (FIG. 2.).

The known output devices mentioned above, have a tendency to only bring together and/or try to force the material in certain directions—either towards other material or towards the walls or the like of the container—which brings evident tendencies of packing, and the devices tend to work against the falling down of the material to the discharge opening. This is a great problem at storing of materials that have a tendency to pack. Many containers also have a considerable volume, whereas any outer influence of the container to shake down material is not possible.

BRIEF DESCRIPTION

The object of the present invention is to solve the drawbacks that the known devices present.

The output device according to the invention comprises a hub and at least two arms fixed to the hub. According to a main aspect the present invention is characterized in that each arm is designed with at least one outer section, designed and arranged to at use being capable of essentially prevent material from being brought towards the wall of the container, and at least one inner section, connected to the outer section, designed and arranged to at use being capable of bringing the material essentially in the direction of feed for the device, at which the at least two arms present essentially concave surfaces facing the direction of feed.

When using an output device according to the invention, there is a considerable smaller risk for tendencies of packing of the material, than with the devices according to prior art. A large discharge efficiency is obtained since the arms of the device reach out to the periphery and affect the entire horizontal surface of the container, all the way out to its inner walls and that the material there is not exposed to forces directed outwards that otherwise causes a packing and in worst case a bridging. Instead, it is seen to that the material at the inner wall of the container is carried forwards in the direction of feed. A further advantage is that the arms do not cover the discharge opening completely at any time, at which an unbroken export of the materials can carry on. By using this output device, a uniform output capacity is made possible irrespective of the coefficient of fullness of the container.

Further tendencies of packing are prevented by a frame arranged to the arms, at the same time as the frame stiffens the arms and the parts of the device can be made more slender than without the frame. The stiffening also prevents lifting of the arms upwards from the bottom of the container.

To ensure the prevention of tendencies of packing the arms are bent in the same direction, whereas the direction of feed for the material moved in the bottom of the container always is directed the same way, that is in the direction of feed of the device.

Preferably, the arms are designed with a wedge-shaped cross section—where the wedge-shape tapers contrary to the direction of feed—which is advantageous at a reciprocating movement of the device, whereas the arms "slide" under the material without bringing the material along when the arms are moved against the direction of feed. This brings, in combination with the bending direction of the arms, that the material either at the reciprocating movement is brought or forced together.

It is further advantageous to together with the present output device use at least one gap-shaped discharge opening in the bottom of the container, for instance directed radially, to obtain a good output capacity. Furthermore, this type of discharge opening is advantageous for material with a great degree of floating.

Yet, the main thing of the invention is the bent form of the arms and the function this gives for the output from silos and similar spaces.

These and other aspects of, and advantages with the present invention will be apparent from the detailed description and the accompanying drawings.

SHORT DESCRIPTION OF DRAWINGS

Figure 5:
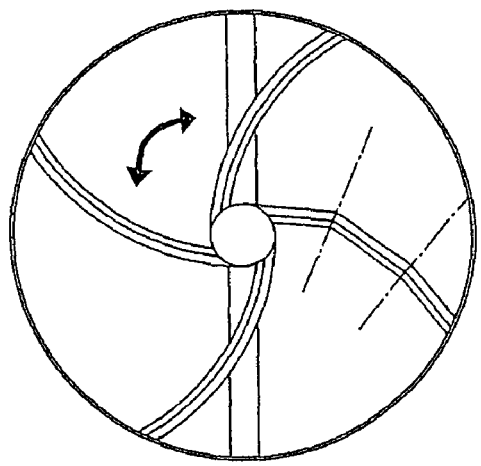
Figure 6:
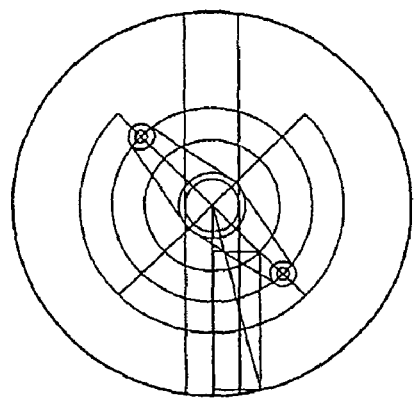
Figure 3:
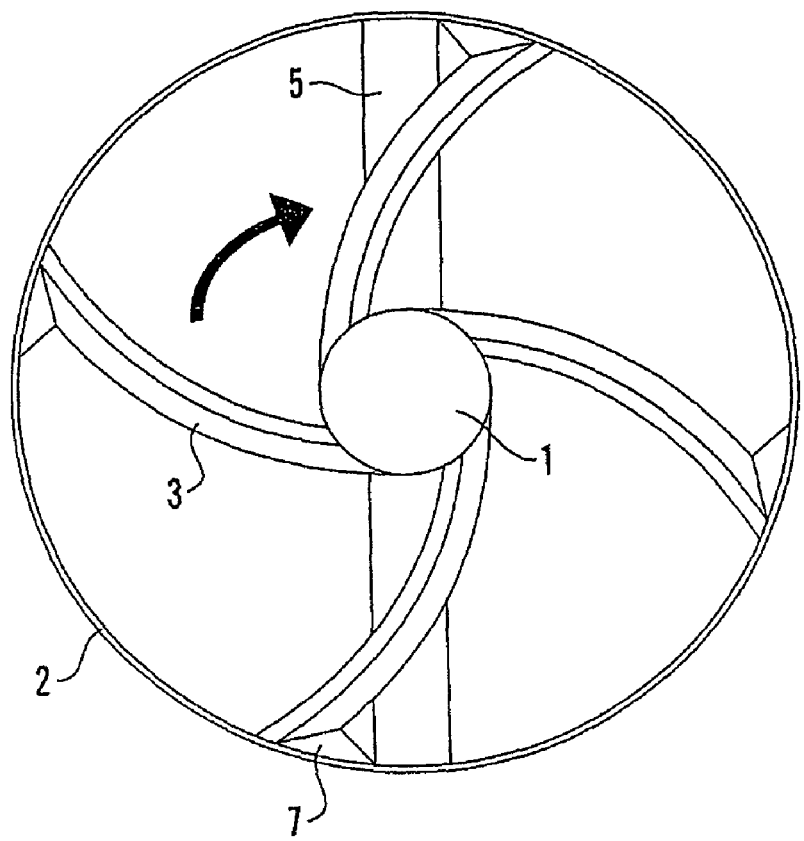
Figure 4:
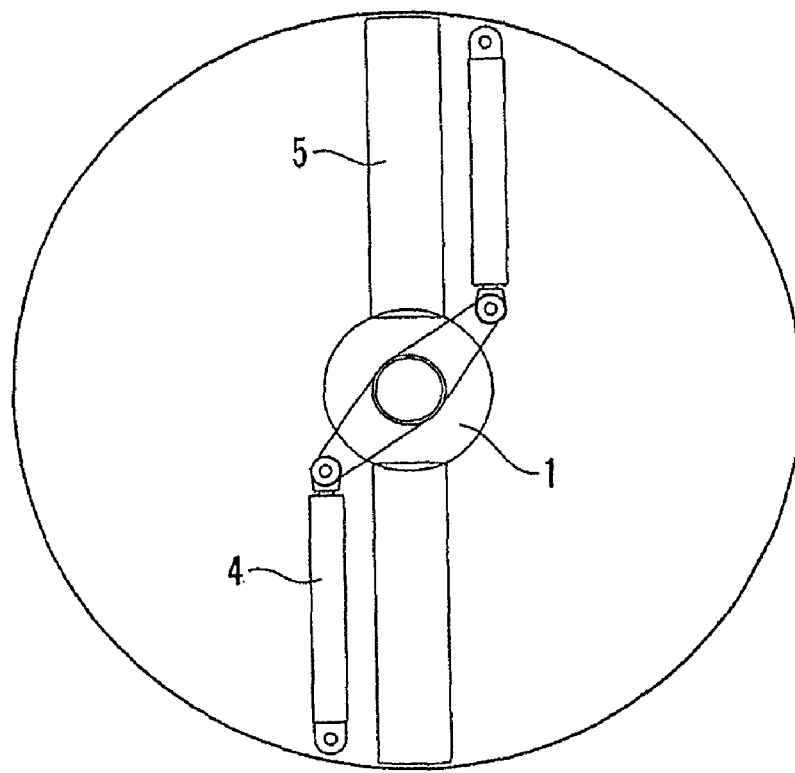
Figure 7A:
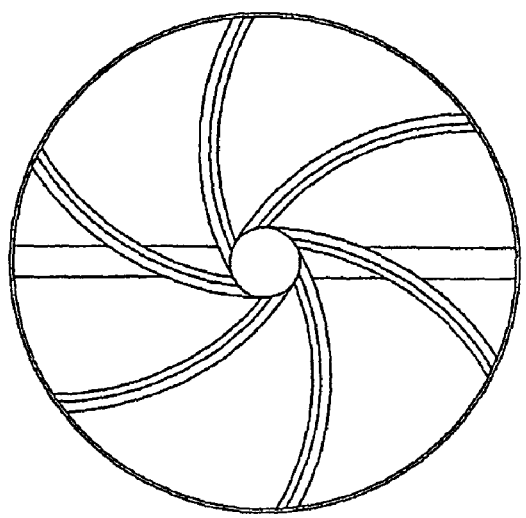
Figure 7B:
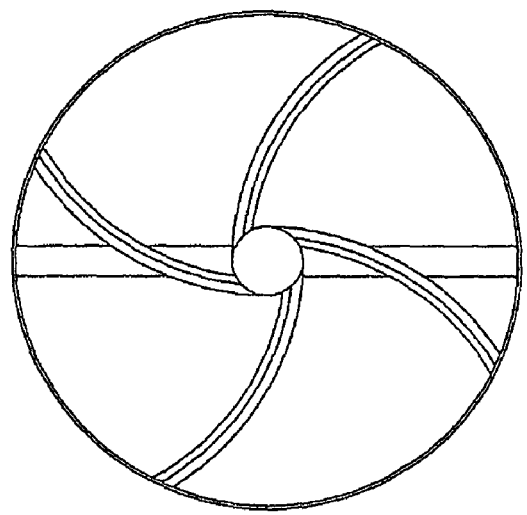
Figure 7C:
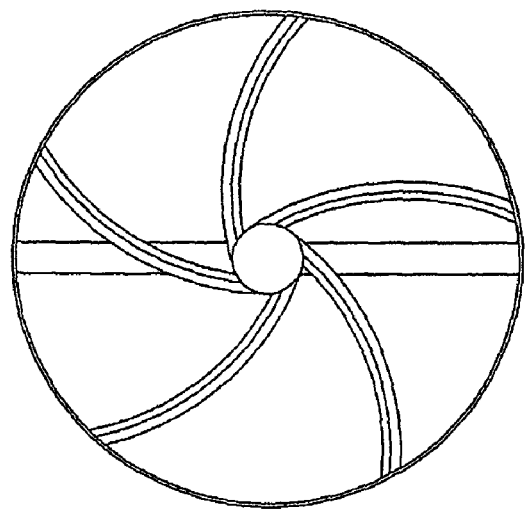
Figure 8A:
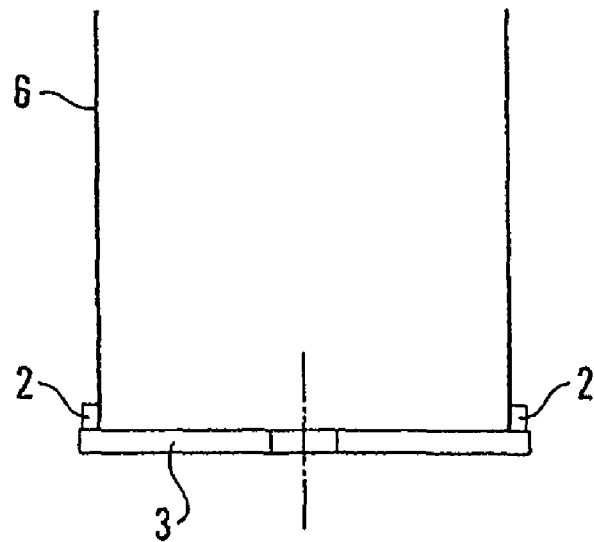
Figure 8B:
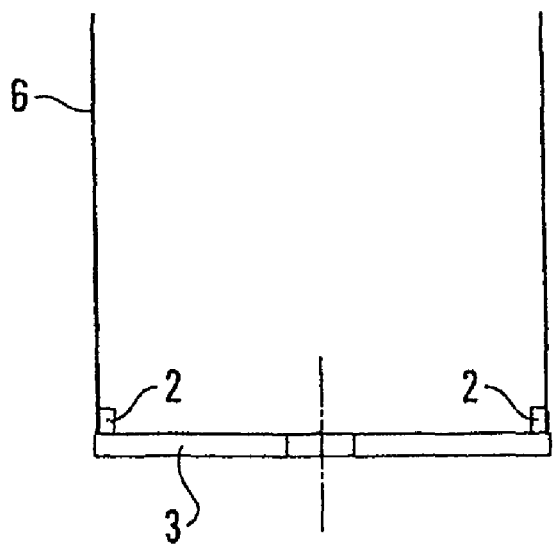

In the detailed description of the present invention reference will be made to the accompanying drawings, wherein, FIGS. 1A, 1B, and 1C show prior art output devices in plan view, FIG. 2 shows a cross section of a silo where the material has packed above the output device, FIG. 3 shows a plan view of an output device according to the invention in a cut above the arms, FIG. 4 shows a plan view in a cut under the arms of an output device where the driving is exerted with a reciprocating movement, FIG. 5 shows the sections along an arm diagrammatically, FIG. 6 shows a diagrammatic view of a reciprocating arm movement, FIGS. 7A, 7B, and 7C show alternate variants of the output device according to the invention in plan view, FIGS. 8A and 8B show embodiments in cross section where the frame is arranged to the container.

DETAILED DESCRIPTION OF THE EMBODIMENTS OF THE INVENTION

FIG. 3 shows an output device according to the invention. It comprises a centre hub 1 rotatably mounted on an axis applied to the bottom of the container (not shown in the figure) and with a suitable driving. Suitably, the container 6 has a circular cross section, but one can also consider other designs of the container 6 where the invention solves it purpose.

The device is connected to a suitable driving device, and the device can be rotated or be given a reciprocating movement (FIG. 5). A number of arms 3 are driven by way of the hub 1, which in turn brings the material towards the discharge opening(-s) 5 of the container. The driving device can consist of one or several hydraulic pistons 4, which affect the arms 3 of the output device in the cases when the output device is moved with a reciprocating movement around the hub (FIGS. 4, 5).

A plurality of arms 3 extend essentially out to the inner wall of the container 6. Each arm is designed with at least one outer section (FIG. 5), designed and arranged to at use being capable of essentially preventing that the material is brought towards the inner wall of the container, and at least one inner section connected to the outer section, designed and arranged to at use being capable to bring the material essentially in the direction of feed of the device.

By direction of feed, it is meant the direction in which the device brings the material towards the discharge opening(-s) 5. At a rotating movement the direction of feed agrees principally with the direction of movement, whereas the direction of feed at a reciprocating movement coincides with the one direction of movement (clockwise in the drawings).

The sections of each arm can be straight or form an angle with each other. Each section can be divided in further parts, where the separate parts are straight but together form a "bent" section.

In one embodiment of the invention, each arm 3 is continuously bent, that is having a constant radius, which is advantageous at manufacturing. Thus, the arms present an essentially concave design. The arms are further arranged so that the concave parts are directed the same way, seen in the direction of feed of the device. The concave surfaces face the direction of feed of the device.

The number of arms can be varied depending on the kind of material being discharged and can be even or uneven (FIG. 7). An increased output capacity is obtained with several arms, and the distribution of load is more uniform than with only one arm.

The arms 3 are preferably designed with a wedge-shaped cross section where the wedge-shape tapers contrary to the direction of feed, which is advantageous at a reciprocating movement, to in one direction slide under the material without bringing it along and in the other direction push a certain amount of material before.

Another detail is an essentially annular frame 2 arranged adjacent to the outer ends of the arms 3. The frame 2 can be fixed to the arms 3 or to the container 6 (FIGS. 8A, 8B). In addition to the arms 3, during its movement, this frame 2 further prevents material from being packed towards the inner wall of the container 6. Furthermore, the frame 2 stiffens the output device and decreases the risk for shear and bending failure of the device. The stiffening also prevents lifting of the arms from the bottom of the container 6. The frame 2 in the embodiment shown is circular, but can also be designed with other geometrical forms, for example astral or polygonal.

The arms 3 can be designed with a certain reinforcement 7 towards the frame 2 to even more increase the strength of the output device. Vault breaker can also be arranged on the frame or the arms to even more prevent bridging.

In association with the embodiment shown, the discharge opening (-s) 5 of the container is radial and runs from the inner wall of the container essentially towards its centre, but can be designed and located in a variety of different ways depending on how the subsequent handling is done; asymmetrically over the bottom, in angle with each other, in pairs etc. Preferably, at least one gap-shaped discharge opening is formed in the bottom of the container, for example radially directed, to obtain a good output capacity. Furthermore, this type of discharge opening is advantageous for material with a great degree of floating.

When a material stored in a container (silo) 6 is to be emptied out, the hub 1 drives the arms 3 around in the bottom of the silo either with a rotating or reciprocating movement, and in that way affects the material lying above the device in the silo, "activation" of the material. The concave surfaces of the bent arms 3 bring the material before them and the material is in that way brought towards the discharge openings 5 and is there discharged, by way of conveying screws or such arranged in a suitable space, to a truck platform or the like for dosage or charging. The arisen void above the output device allows the material lying above to fall down towards the output device. This is usually a continuous process, wherefore material is fed out of the silo the whole time.

For material with a great degree of floating (tendency to fall down), the device does not have to be run continuously. Preferably, a level guard is arranged in association with the conveying screws, which senses the presence of material. If the level guard does not sense any material the output device is activated, and material is fed.

The bending of the arms gives an active working of the material and therefore a more efficient output. The bent arms 3 prevent material from being packed along the wall of the container 6 and by that create bridging or being compacted, which otherwise will lead to that the amount of output material decreases. Due to the bending of the arms, the discharge opening 5 is never completely covered at any time, and therefore material can always fall down somewhere in the discharge opening 5 and further out from there.

The embodiments shown in the drawings and put forward in the description should not be considered restricting, only as exemplifying.

The invention claimed is:

1. Output device for a container (6) which comprises a bottom and a surrounding wall and a discharge opening, comprising a hub (1) and at least two arms (3) fixed to the hub (1), wherein,
   each arm (3) is designed with
   i) at least one outer section designed and arranged to, at use, be capable of essentially preventing material from being brought towards the wall of the container (6), and
   ii) at least one inner section connected to the outer section, designed and arranged to, at use, be capable of bringing the material essentially in the direction of feed for the device, the direction of feed being the direction in which the device brings the material towards the discharge opening,
   the at least two arms (3) present essentially concave surfaces facing the direction of feed, and extend to the wall of the container (6), and
   the bottom of the container has at least one gap-shaped discharge opening (5) extending from the inner wall of the container radially to the hub (1),
   a frame (2) is arranged adjacent to the outer ends of the arms (3), the frame being fixed to the container (6),
   wherein the arms (3) are designed with a wedge-shaped cross section along the entire length of the arms, where the wedge-shape tapers more gradually on a side contrary to the direction of feed in order to, in the direction of feed push material and in the contrary direction, slide under the material without bringing it along.

2. Output device according to claim 1, wherein each arm (3) is continuously bent.

3. Output device according to claim 2, further comprising a driving device capable of driving the arms with a reciprocating movement.

4. Output device according to claim 1, further comprising a driving device capable of driving the arms with a rotating movement.

5. Output device according to claim 1, further comprising a driving device capable of driving the arms with a reciprocating movement.

6. Output device according to claim 1, wherein, at use, the arms (3) never completely cover the discharge opening (5).

* * * * *